United States Patent [19]
Uhl

[11] Patent Number: 5,896,669
[45] Date of Patent: Apr. 27, 1999

[54] CUTTERHEAD FOR AN OVERHEAD BRANCH CUTTER

[75] Inventor: Klaus-Martin Uhl, Baltmannsweiler, Germany

[73] Assignee: Andreas Stihl, Waiblingen, Germany

[21] Appl. No.: 08/854,986

[22] Filed: May 13, 1997

[30] Foreign Application Priority Data

May 13, 1996 [DE] Germany .......................... 196 19 081

[51] Int. Cl.⁶ .................................................. B27B 17/12
[52] U.S. Cl. ............................................ 30/383; 30/123.4
[58] Field of Search .................................. 30/123.4, 276, 30/296.1, 383

[56] References Cited

U.S. PATENT DOCUMENTS

| | | | |
|---|---|---|---|
| 3,844,380 | 10/1974 | Batson | 30/383 |
| 4,321,838 | 3/1982 | Feldman | 30/383 |
| 4,636,147 | 1/1987 | Schweitzer et al. | 30/123.4 |
| 4,757,613 | 7/1988 | Baudreau et al. | 30/383 |
| 4,884,340 | 12/1989 | Newman | 30/123.4 |
| 5,653,028 | 8/1997 | Hashimoto | 30/123.4 |
| 5,718,050 | 2/1998 | Keller et al. | 30/123.4 |

*Primary Examiner*—Hwei-Siu Payer
*Attorney, Agent, or Firm*—Walter Ottesen

[57] ABSTRACT

The invention is directed to a cutterhead for an overhead branch cutter. The cutterhead includes a work tool and a gear assembly housing having a lower housing part and an upper housing part defining a closure cover for the lower housing part. A gear assembly is mounted in the housing and includes an input shaft and an output shaft disposed transversely to the input shaft. A first bearing unit journals the input shaft and a second bearing unit journals the output shaft in the gear assembly housing. Intermeshing gears are mounted between the input shaft and the output shaft. The lower housing part and the upper housing part conjointly define a partition plane partitioning the first and second bearing units. A one piece attachment flange is formed on the lower housing part and the output shaft has an outer end extending through the attachment flange. The work tool is mounted on the attachment flange and is operatively connected to the outer end of the output shaft.

18 Claims, 9 Drawing Sheets

CUTTERHEAD FOR AN OVERHEAD BRANCH CUTTER

BACKGROUND OF THE INVENTION

Cutterheads used in overhead branch cutters are known. These cutterheads are held at the end of a guide wand in which a drive shaft is journalled. The drive shaft is driven by a drive motor and is connected to the input shaft of a gear assembly mounted in the cutterhead. The drive shaft is especially connected via an insert connector in order to drive the work tool via the gear assembly. The work tool is held on the cutterhead. For this reason, the cutterhead must, on the one hand, be built to provide adequate stability so that it can assume the loads occurring during operation; while, on the other hand, the cutterhead should be as light as possible because a cutterhead, which is too heavy, makes working with the overhead branch cutter difficult and limits its functionality.

SUMMARY OF THE INVENTION

It is an object of the invention to provide a cutterhead for an overhead branch cutter which is so configured that a high functionality with a large power capacity is achieved with a simple configuration and a small structural size.

The cutterhead of the invention is for an overhead branch cutter and includes: a work tool; a gear assembly housing having a lower housing part and an upper housing part defining a closure cover for the lower housing part; a gear assembly mounted in the housing and including an input shaft and an output shaft disposed transversely to the input shaft; first bearing means and second bearing means for journalling the input shaft and the output shaft, respectively, in the gear assembly housing; and, gear means mounted between the input shaft and the output shaft; the lower housing part and the upper housing part conjointly defining a partition plane partitioning the first and second bearing means; a one piece attachment flange formed on the lower housing part; the output shaft having an outer end extending through the attachment flange; and, the work tool being mounted on the attachment flange and being operatively connected to the outer end of the output shaft.

A simple configuration of the gear assembly housing is possible by selecting the partition plane which partitions all shaft bearings in the gear assembly housing. The bearing seats must not be further machined. It is possible to produce the housing parts of the gear assembly housing at low cost and with adequate precision, for example, with a die casting process. The selected partition plane permits simple assembly and, as required, a simple disassembly for later maintenance. The one-part attachment flange ensures a high stiffness. The gear assembly housing and the attachment flange are advantageously made of plastic.

It is preferable to mount a lubricating-oil pump in the lower housing part. The lubricating-oil pump is preferably pressed into position and is driven by the output shaft of the gear assembly. In this way, the requirement of lubricating oil in the area of the cutterhead is satisfied in a simple manner. A simple assembly is made possible by pressing in the lubricating pump. The lubricating-oil pump comprises a pump piston and a pump cylinder. The sprocket wheel cover can be configured to be very flat because of the arrangement of the lubricating-oil pump in the gear assembly housing. Accordingly, a cut close to the trunk of a tree is possible with the cutterhead.

The lubricating-oil tank necessary for the lubricating-oil pump is preferably held on the side, which faces toward the gear assembly housing, on the attachment flange. To achieve the highest possible tank volume, the tank housing surrounds the gear assembly housing over a peripheral angle of more than 180°. The tank housing advantageously lies on the end of the gear assembly housing facing away from the receiving sleeve, that is, facing toward the guide bar. On the one hand, a large tank volume can be provided in this way and, on the other hand, by a corresponding configuration of the tank housing, which lies in the work direction ahead of the gear assembly housing, the cutterhead can be so configured that it does not become caught in the branches of a tree.

In a special configuration of the invention, the lubricating-oil tank itself has a connecting nipple which engages directly in an intake opening of the lubricating-oil pump fixedly mounted on the housing. The connecting nipple is at the lower side of the gear assembly housing thereby ensuring that adequate lubricating oil is available at the intake connection in the usually expected operating positions of the overhead branch cutter.

Preferably, the work tool is a saw chain driven on a guide bar by a sprocket wheel. The guide bar is clamped between the attachment flange and a sprocket wheel cover fixed on the attachment flange. The sprocket wheel cover is closed over its peripheral edge facing toward the guide bar and has a tensioning opening at the lower side of the housing. In this way, the operator of the overhead branch cutter is not inconvenienced by down-falling cuttings.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
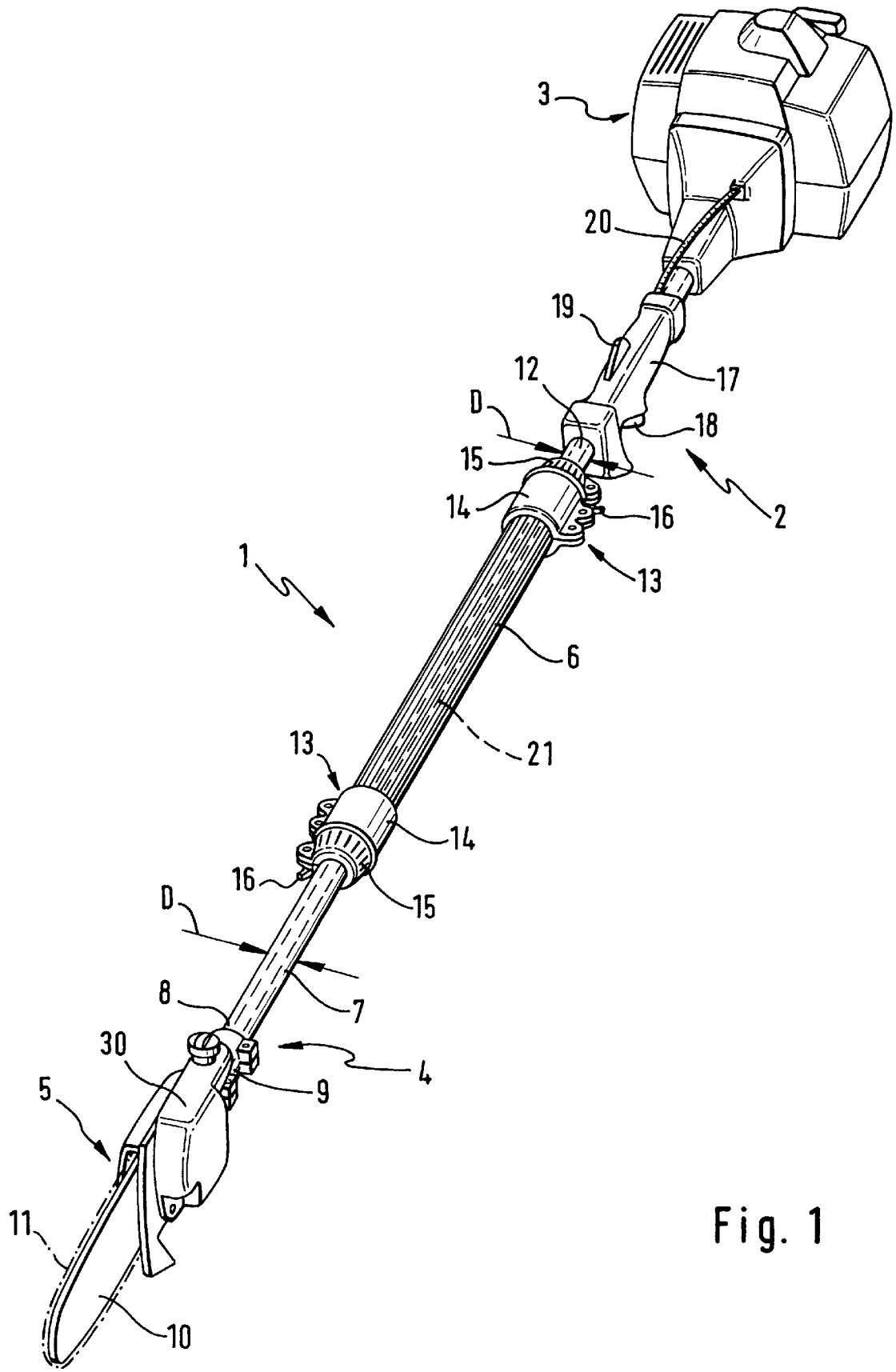
FIG. 1 is a schematic of an overhead branch cutter.

The portable handheld work apparatus shown in FIG. 1 is utilized to cut away branches of trees or the like and is also known as an overhead branch cutter. The work apparatus comprises a telescope wand 1 which has a drive motor 3 at one end 2 thereof and a cutterhead 5 at the other end 4 thereof. The telescope wand 1 is assembled from an outer tube 6 and an inner tube 7 displaceably guided in the outer tube. The free end 8 of the inner tube 7 carries the cutterhead 5 which comprises essentially a gear assembly housing 9 having a miter gear assembly. The input shaft of the miter gear assembly is connected to a drive shaft 21 journalled in the telescope wand 1. The drive shaft 21 is, in turn, driven by drive motor 3. In this way, a saw chain 11 is driven on a guide bar 10 via the miter gear assembly.

A connecting tube 12 projects inwardly at the end of the outer tube 6 facing toward the drive motor 3. The connecting tube 12 is held in the outer tube 6 at its engaging end section. A clamping piece 13 is mounted at each end of the outer tube. The two clamping pieces 13 are held by respective attachment collars 14 at corresponding ends of the outer tube 6 so that they cannot become separated therefrom. A clamping sleeve 15 extends from the attachment collar 14. The clamping sleeve 15 is matched to the outer diameter D of the inwardly-projecting inner tube 7 or of the inwardly-projecting connecting tube 12. The clamping sleeve 15 can be tightly clamped by clamping screws 16 on the engaging end tube (7, 12) after the telescope wand 1 is pushed in or pulled out to the desired length.

The connecting tube 12 is mounted between the outer tube 6 and the drive motor 3 and carries essentially an operator handle 17. A throttle lever 18 and a throttle lever latch 19 are mounted in the operator handle 17. The throttle lever 18 is connected to a positioning element via a bowden cable 20 for operating the drive motor 3. In the embodiment shown, the drive motor is an internal combustion engine and is especially a two-stroke engine having a membrane carburetor. The positioning member, which is actuated via the bowden cable, is the throttle flap of the membrane carburetor supplying the mixture to the drive motor.

Figure 2:
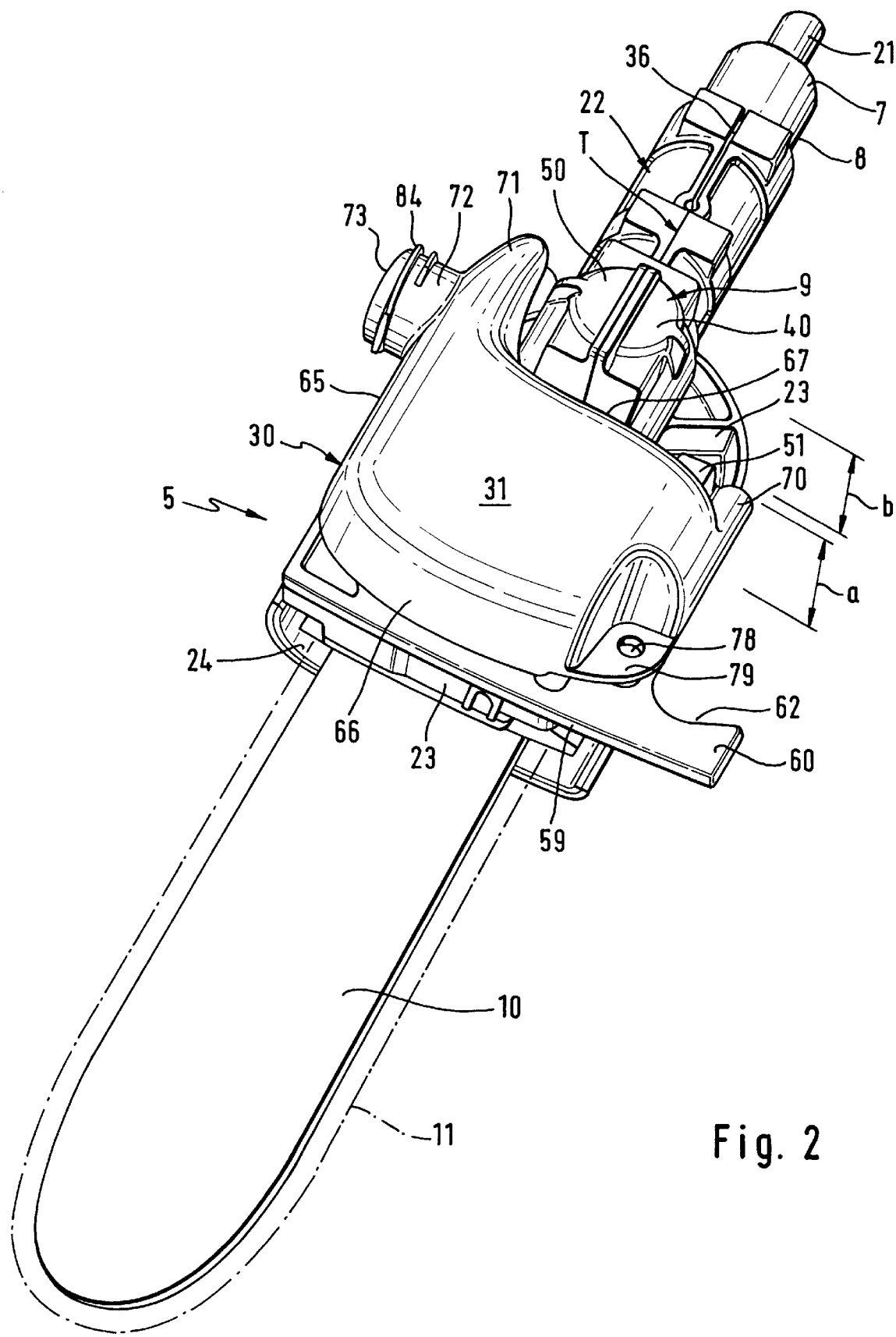
FIG. 2 is an enlarged view of a cutterhead for the overhead branch cutter of FIG. 1.
Figure 3:
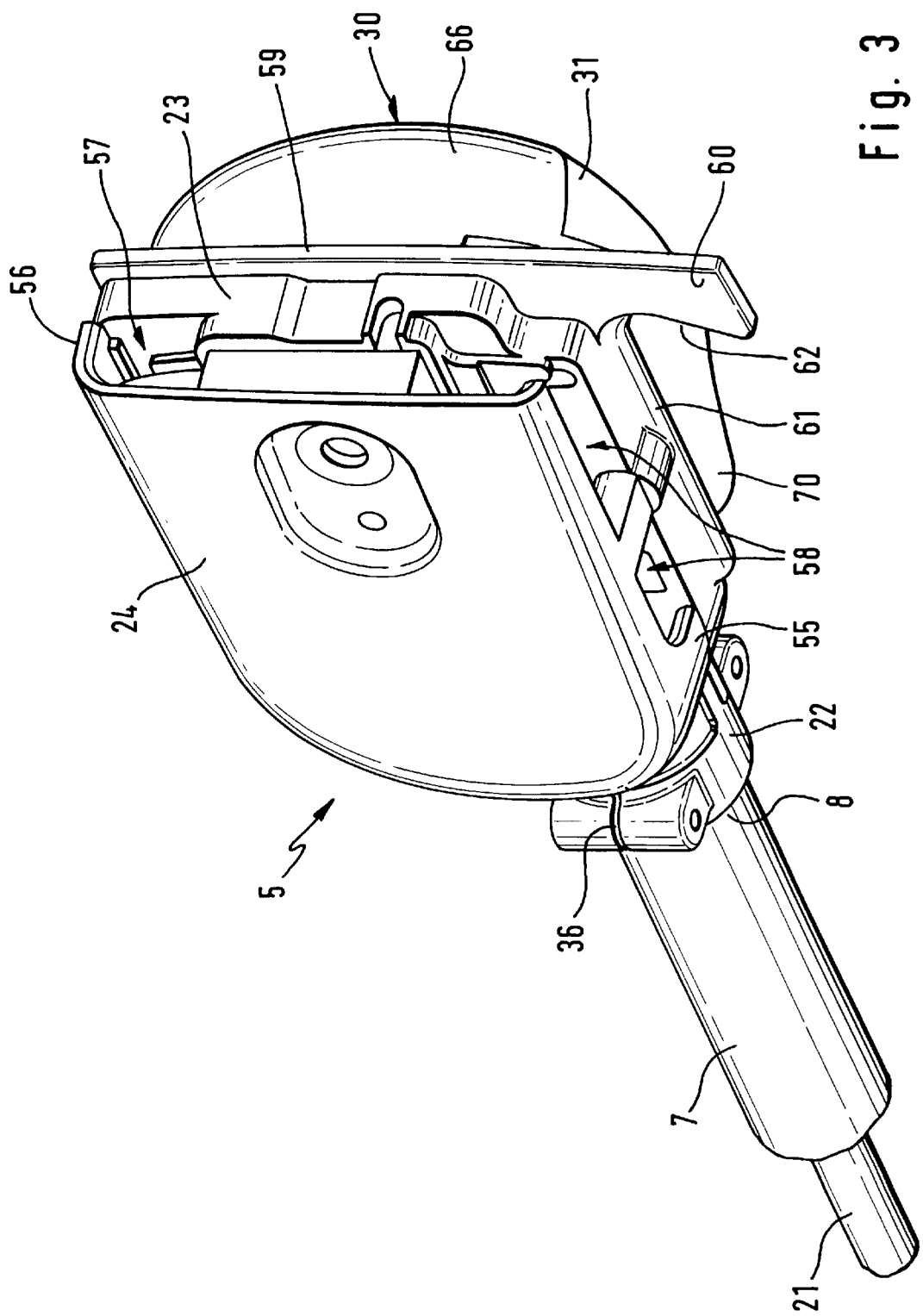
FIG. 3 is a view of the side of the sprocket wheel cover of the cutterhead of FIG. 2.
Figure 4:
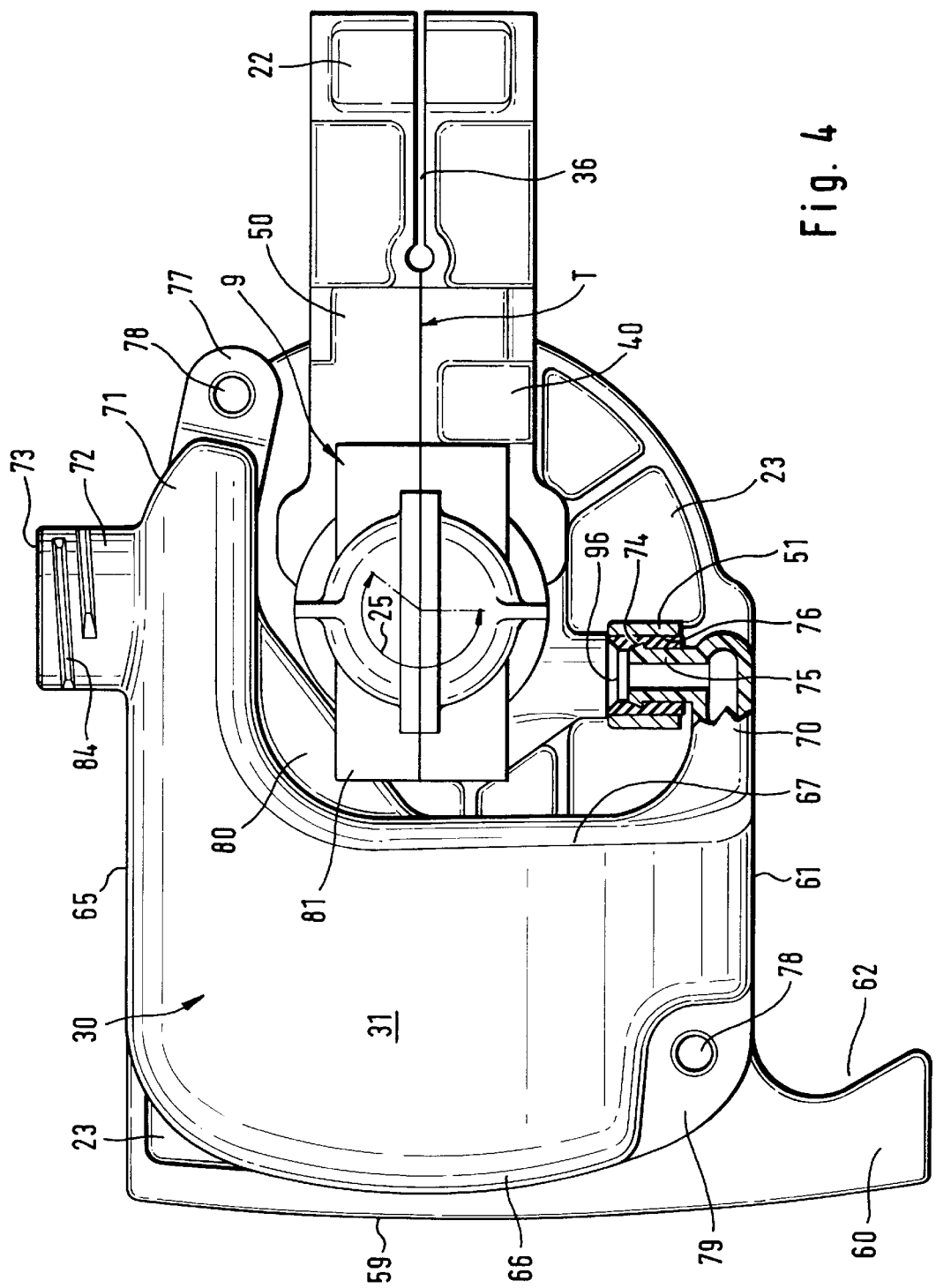
FIG. 4 is a view of the side of the tank housing of the cutterhead of FIG. 2.

The cutterhead of the invention for an overhead branch cutter is shown in various views in FIGS. 2 to 4. The cutterhead essentially comprises a gear assembly housing 9 for the miter gear assembly. A connecting sleeve 22 extends from the gear assembly housing 9. The connecting sleeve 22 engages over the end 8 of the inner tube 7 of the guide wand configured as a telescope wand 1 and is held thereon. The gear assembly housing 9 further includes an attachment flange 23 having a side facing away from the gear assembly housing 9. A sprocket wheel cover 24 can be fixedly screwed to this side of the attachment flange 23.

As shown in FIG. 2, the guide bar 10 having the saw chain 11 mounted thereon is clamped between the sprocket wheel cover 24 and the attachment flange 23. The attachment flange 23 with the guide bar 10 extends essentially on the end of the gear assembly housing 9 facing away from the connecting sleeve 22. On the side facing away from the sprocket wheel cover 24, the attachment flange 23 carries a lubricating-oil tank 30 lying approximately congruently. The lubricating-oil tank 30 surrounds the gear assembly housing 9 over a peripheral angle 25 (see FIG. 4) of more than 180°. In the embodiment shown, the peripheral angle is 225°. The tank housing 31 of the lubricating-oil tank 30 surrounds the gear assembly housing 9 on the end thereof facing away from the connecting sleeve 22.

The configuration of the gear assembly housing 9 is shown in detail in FIGS. 5 to 10.

Figure 5:
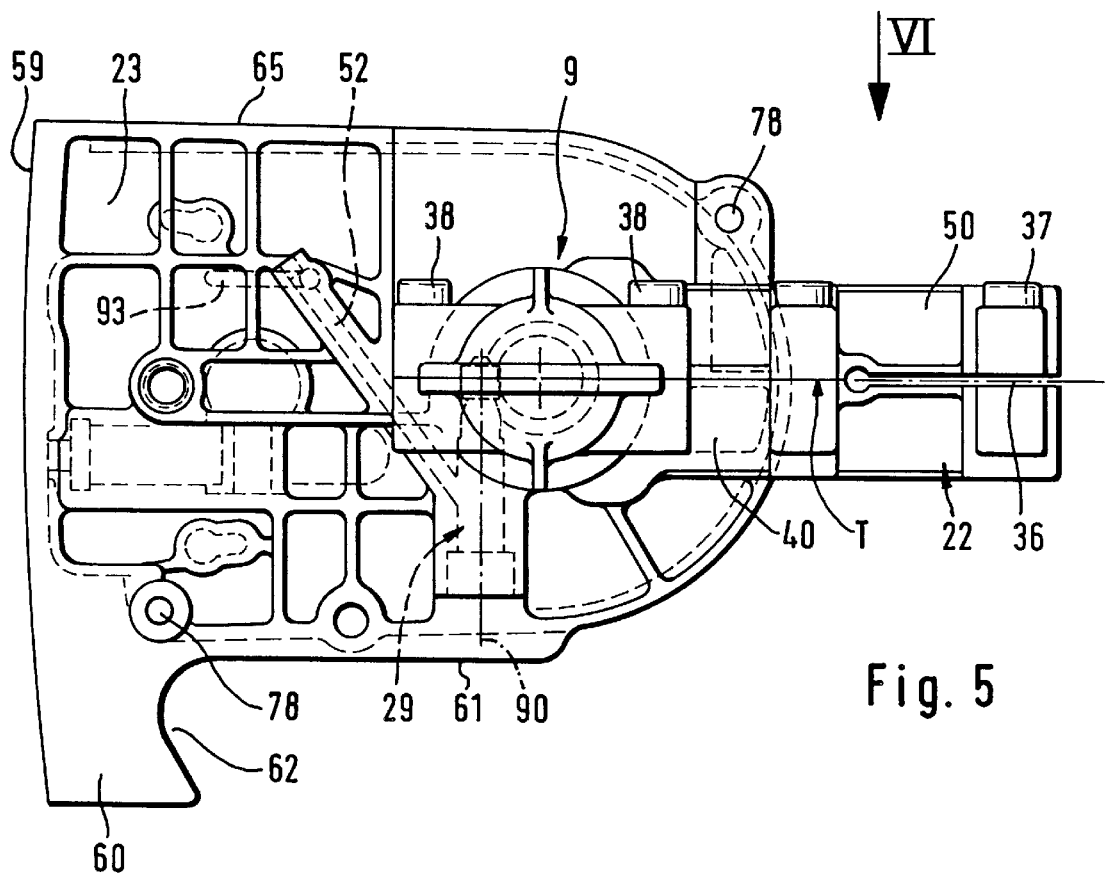
FIG. 5 is a view toward the gear assembly side of the cutterhead with the tank housing removed.

FIG. 5 corresponds to the view of FIG. 4 but with tank housing 31 removed. As can be easily seen in combination with FIG. 6, the gear assembly housing 9 comprises a lower housing part 40 and an upper housing part 50 configured as a closure cover. An input shaft 41 is mounted in the lower housing part 40 as shown in FIG. 7. The input shaft 41 carries a conical gear 42 at the end thereof projecting into the gear assembly housing 9. The conical gear 42 meshes with a further conical gear 43 which is mounted on an output shaft 44 which essentially lies transversely to the input shaft 41. The arrangement is so configured that the rotational axis 45 of the input shaft 41 and the rotational axis 46 of the output shaft 44 lie in a common plane. This plane, which is determined by the rotational axes 45 and 46, is, at the same time, the partition plane T of the gear assembly housing 9. The partition plane T therefore cuts through all shaft bearings (47, 48, 49) with which the shafts 41 and 44 are rotatably journalled in the gear assembly housing 9. The bearing 47 of the input shaft 41 comprises a double roller bearing which is mounted on the center section of the input shaft 41. The bearings 48 and 49 of the drive shaft 44 are likewise configured as roller bearings. The roller bearings 48 and 49 are mounted at the respective ends of the output shaft 44. The end 34 projects out of the gear assembly housing 9 and carries a sprocket wheel 35 via which the saw chain 11 is driven.

The attachment flange 23 is mounted on the lower housing part 40 on the side of the sprocket wheel 35. The rotational axis 46 of the output shaft 44 is perpendicular to the plane of the attachment flange 23. The end 34 of the output shaft 44 projects through this plane. The attachment flange 23 is configured as one piece with the lower housing part 40 of the gear assembly housing 9. The attachment flange 23 is preferably made out of a light metal alloy manufactured on the basis of aluminum or magnesium.

Figure 8:
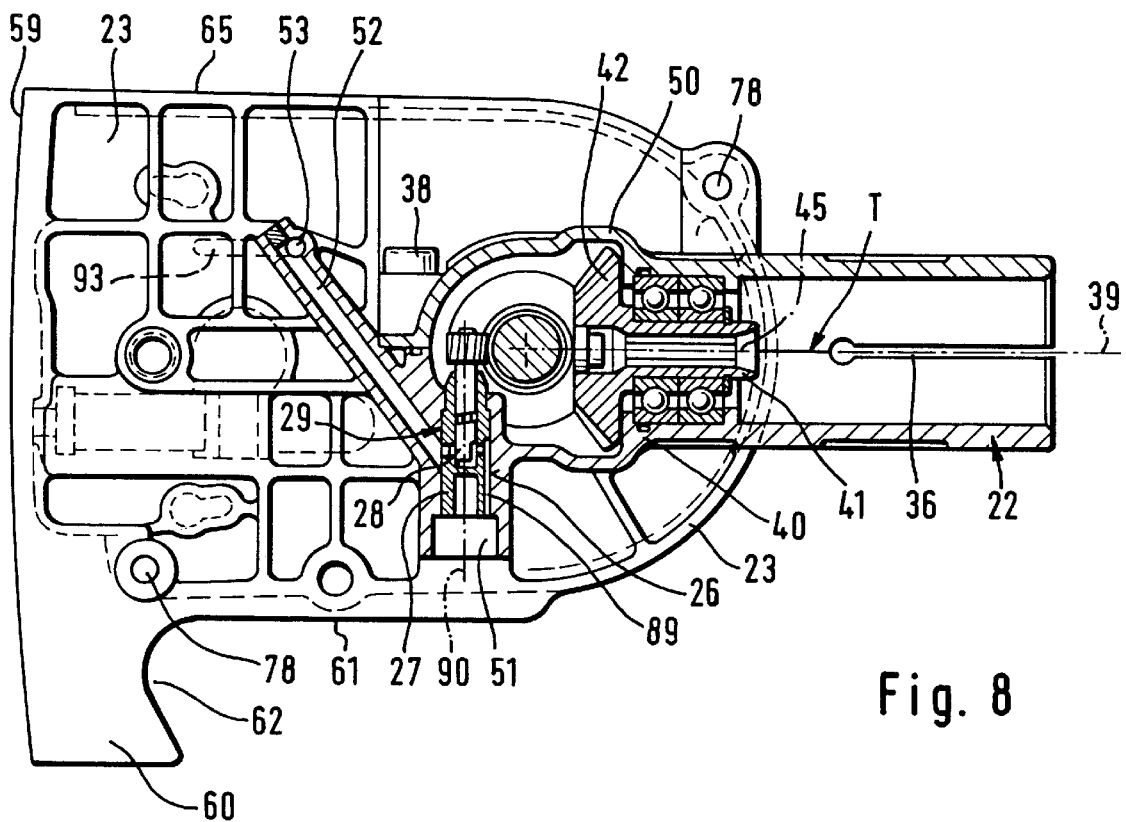
FIG. 8 is a section view taken along line VIII—VIII of FIG. 7.

As shown in FIG. 8, the shaft bearings (47, 48, 49) are held between the closure cover 50 and the lower housing part 40 so that they cannot become separated therefrom and are fixed in their respective positions. The housing parts 40 and 50 further delimit the connecting sleeve 22 for the end 8 of the guide wand. The connecting sleeve 22 is mounted forward of the input shaft 41. Each half of the connecting sleeve 22 is configured as a single piece with the corresponding upper or lower housing part (40 or 50). A slot 36 is provided in the partition plane T between the two sleeve halves and is open toward the free end so that a force-tight fixation is ensured at the end 8 of the inner tube 7 when the clamping screws 37 (see FIG. 6), which connect the sleeve halves, are tightened. The upper housing half, or the closure cover 50, is tightly screwed to the lower housing part 40 by additional screws 38.

The longitudinal center axis 39 of the connecting sleeve 22 lies parallel to the plane 33 which is defined by the attachment flange 23. The attachment flange 23 and the connecting sleeve 22 extend in mutually opposite directions from the gear assembly housing 9. The guide bar 10 lies approximately in alignment to the telescope wand 1. It can be advantageous to configure the attachment flange so as to be displaceable about the rotational axis 46 of the output shaft 44.

The conical gear 43 of the outward shaft 44 meshes with the conical gear 42. The conical gear 43 is mounted on the output shaft 44 so as to rotate therewith. The conical gear 43 is mounted at the end facing away from end 34. A drive gear for a lubricating-oil pump 29 is mounted on the output shaft 44 between this conical gear 43 and the end 34. The drive gear is configured as a worm gear 32. It can be advantageous to form the worm gear on the peripheral surface of the output shaft 44, for example, by a corresponding forming of the outer surface thereof.

Figure 9:
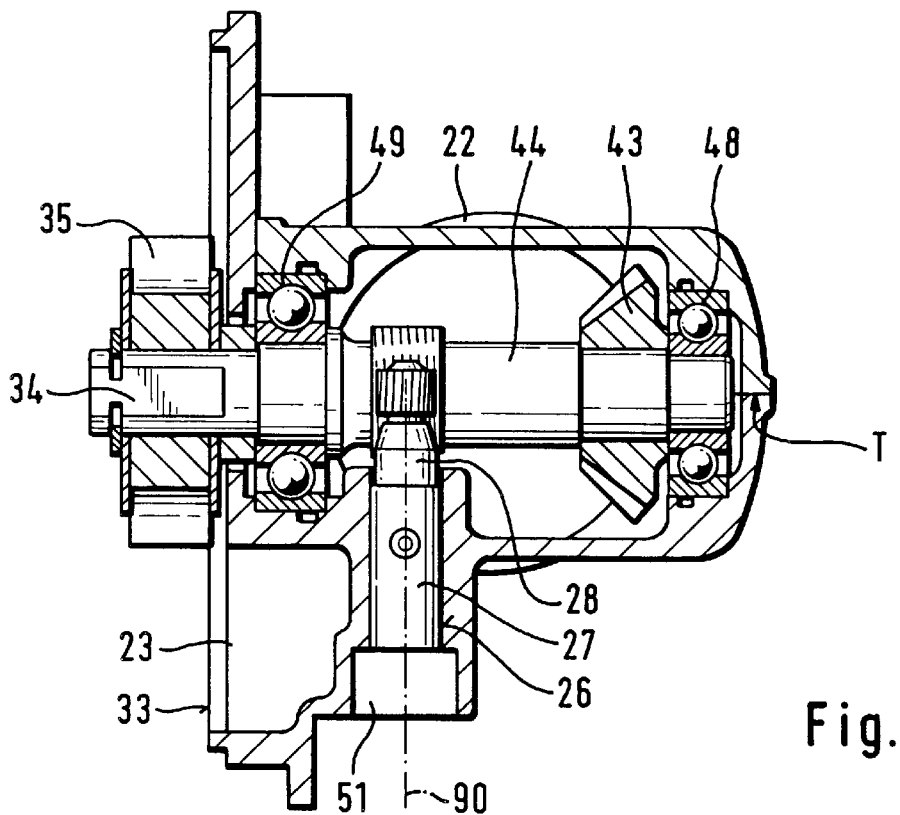
FIG. 9 is a section view taken along line IX—IX of FIG. 7.
Figure 10:
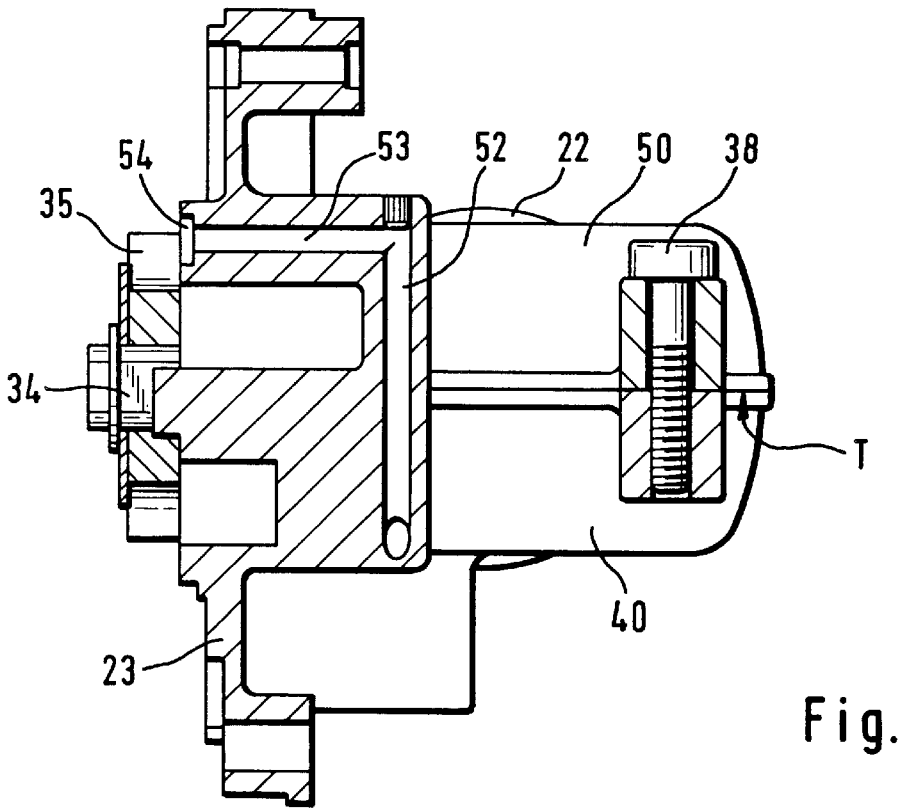
FIG. 10 is a section view taken along line X—X of FIG. 7.

As shown in FIGS. 5, 8 and 9, the rotational axis 90 of the pump piston 28 is parallel to the plane 33 of the attachment flange 23 and is approximately at right angles to each of the rotational axis 46 of the output shaft 44 and the rotational axis 45 of the input shaft 41. The pump piston 28 is seated in a pump cylinder 27 and the pump cylinder 27 is pressed into a receiving bore 26 of the lower housing part 40. The receiving bore 26 terminates in an intake connection 51 which is connected to an intake channel 89 located between the pump cylinder 27 and the receiving bore 26.

The pressure channel 52 of the lubricating-oil pump 29 extends inclined upwardly in a bore of the attachment flange 23 and opens into an outlet bore 53 which lies approximately perpendicular to the plane of the attachment flange 23. The outlet bore 53 has an opening 54 in an oil groove 93 (see FIG. 5). The oil groove 93 extends in the longitudinal direction toward the guide bar 10 in the support surface of the attachment flange 23. The oil groove 93 lies in the region of the sprocket wheel 35 where the sprocket wheel cover 24 or the side surface facing toward the guide bar 10 lies. When the output shaft 44 rotates, lubricating-oil pump 29 pumps lubricating oil from the lubricating-oil tank 30 to the oil groove 93. From here, the lubricating oil passes into the guide groove of the saw chain 11 in the periphery of the guide bar. The saw chain 11 picks up the oil and transports it to the friction locations in order to guide the saw chain 11 in the guide groove of the guide bar 10 at low friction.

Figure 6:
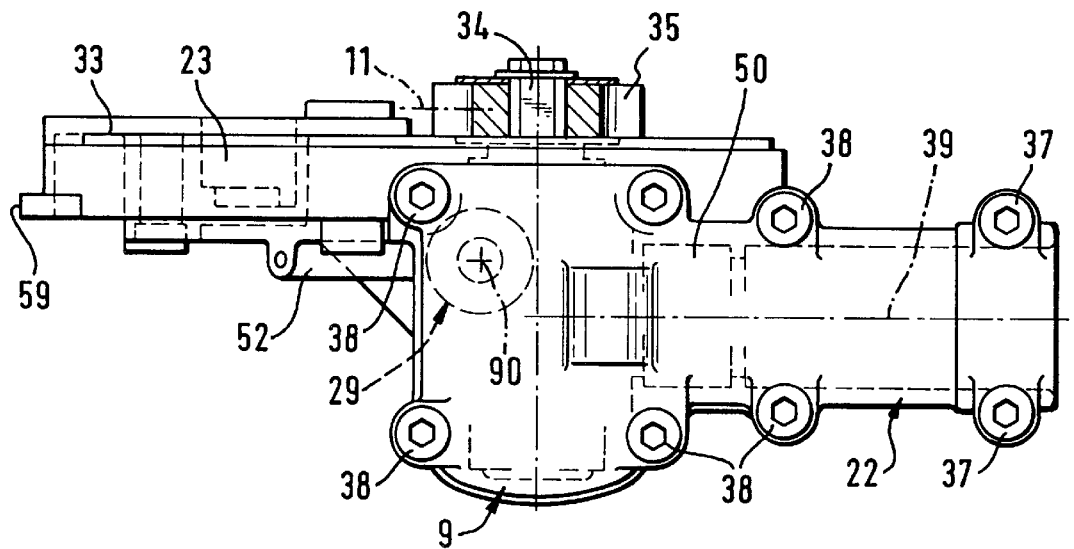
FIG. 6 is a view of the gear assembly housing as seen in the direction of arrow VI of FIG. 5.
Figure 7:
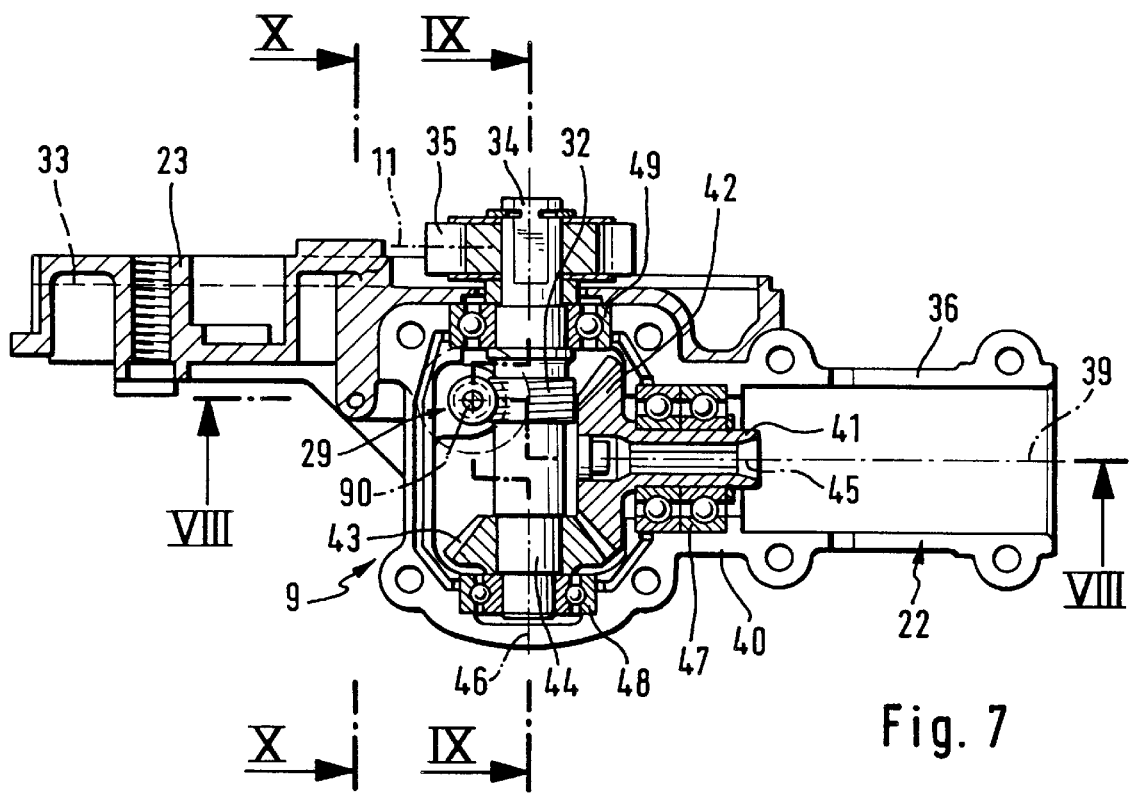
FIG. 7 is a section view through the cutterhead at the elevation of the partition plane T.

The attachment flange 23 extends up to the region of the connecting sleeve 22 and, as shown in FIGS. 6 and 7, is connected in the end region of the connecting sleeve 22. In this way, a stiff connection between the attachment flange 23, the connecting sleeve 22 and the guide wand 1 is provided without applying too great a load to the gear assembly housing 9. The guide wand 1 is held in the connecting sleeve 22.

As shown in FIG. 3, the sprocket wheel cover 24 to be mounted to the attachment flange 23 is configured to be closed over its periphery 55 over more than 180°. This periphery 55 faces toward the connecting sleeve 22. Starting at the upper edge 56 of the periphery of the sprocket wheel cover 24, the latter then lies against the attachment flange 23 whereby a chip collecting space 57 is formed between the sprocket wheel cover 24 and the attachment flange 23. This space has chip discharge openings 58 at the lower side of the cutterhead. In this way, it is ensured that an operator working with the overhead branch cutter is not subjected directly to falling chips. The lubricating-oil pump 29 is held in the gear assembly housing 9 and the lubricating-oil tank 30 is held on the attachment flange on the side facing away from the sprocket wheel cover 24. For this reason, the sprocket wheel cover 24 can be configured to be very flat whereby a cut close to the trunk of a tree is possible.

Advantageously, the attachment flange 23 has a flange projection 60 in the region of its forward end edge 59. This flange projection 60 extends in the plane of the attachment flange 23 beyond the lower housing part 40 of the gear assembly housing 9 and the lower edge 61 of the attachment flange 23. The flange projection 60 is rounded to have a hook-like configuration on its longitudinal edge 62 facing toward the connecting sleeve 22. Accordingly, the flange projection 60 can be utilized as a grab hook when cutting a branch from a tree.

As shown in FIG. 4, the tank housing 31 of the lubricating-oil tank 30 is preferably made of plastic and covers (approximately congruently) a large part of the side of the attachment flange 23 facing toward the gear assembly housing 9. As shown in FIG. 2, the tank housing 31 has a maximum height (a) measured perpendicularly to the attachment flange 23. This height (a) is equal to or slightly greater than the axial height (b) of the gear assembly housing 9, which is measured in the same axial direction. The maximum height (a) is in the inclusion region of the tank housing 31, which is next to the gear assembly housing 9.

Figure 15:
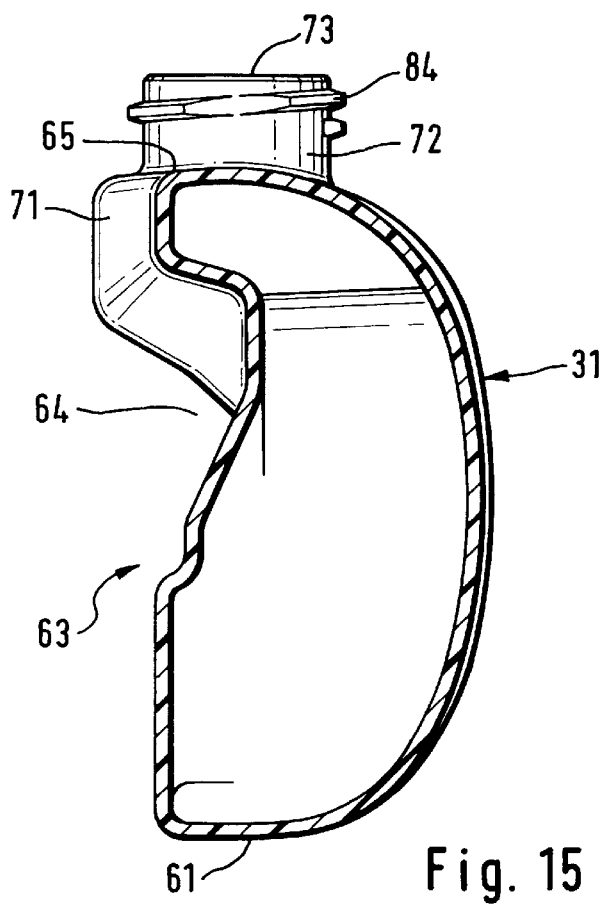
FIG. 15 is a section view taken along line XV—XV of FIG. 11.

When working in trees, and to avoid blocking by the branches, the tank housing 31 is, on the one hand, fixed directly on the attachment flange 23 so that the attachment flange 23 and the tank housing 31 lie at only a slight spacing with respect to each other. For this purpose, indentations 64 (see FIG. 15) are advantageously provided for accommodating sections projecting from the plane of the attachment flange 23 as they are caused, for example, by the pressure channel 52. These indentations 64 are provided in the side 63 of the tank housing 31 facing toward the attachment flange 23. On its outer side, the tank housing 31 is configured so as to be rounded from the lower edge 61 of the attachment flange to the upper edge 65 of the tank housing as shown, for example, in FIG. 15.

Furthermore, the tank housing 31 is configured so as to be arcuate from its end wall 66 to its upper rear edge 67 adjacent the gear assembly housing 9 in such a manner that the tank housing increases in elevation from the forward edge 59 of the attachment flange 23 to the rearward edge 67. The end wall 66 of the tank housing 31 is adjacent the edge 59 of the attachment flange 23.

Figure 11:
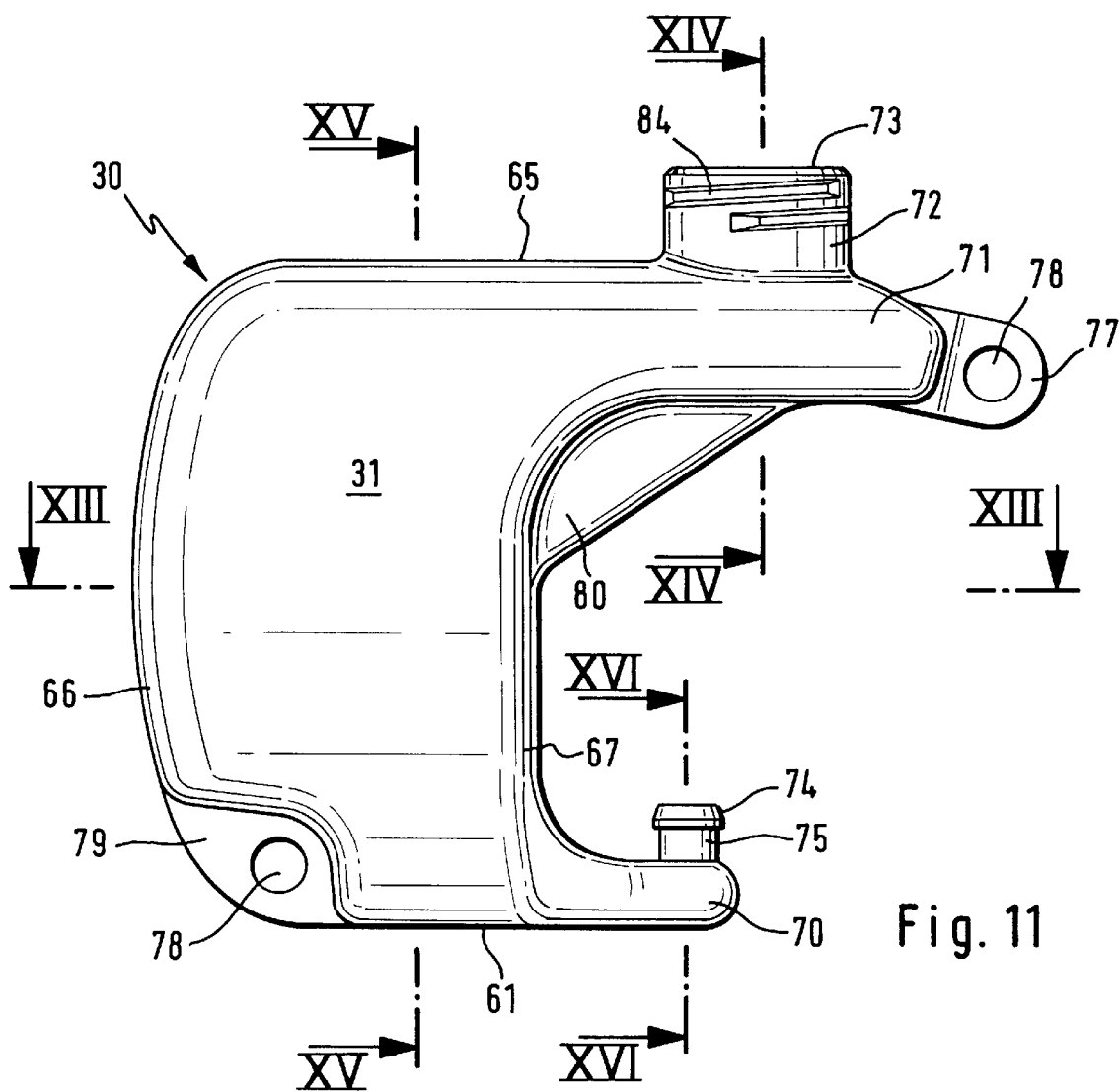
FIG. 11 is a plan view of the tank housing of the cutterhead of the invention.
Figure 12:
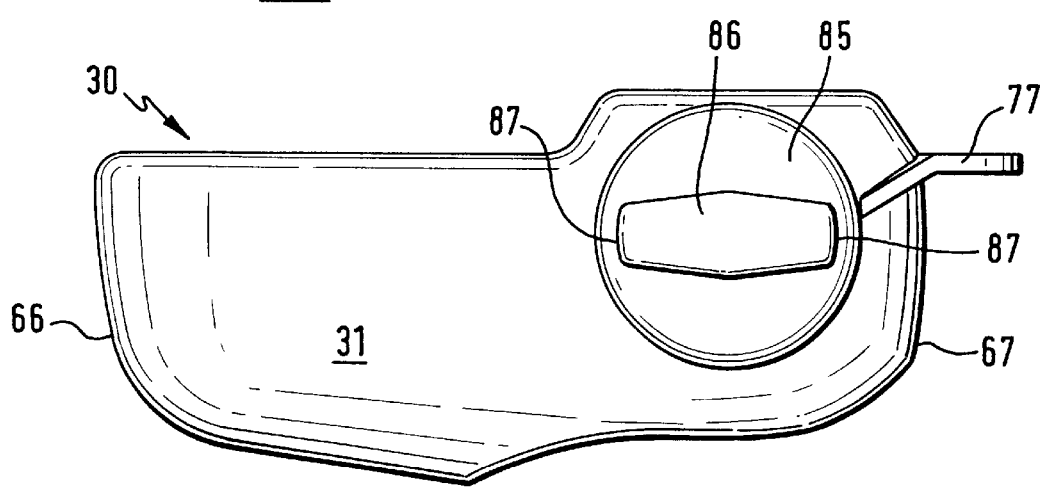
FIG. 12 is a view toward the side of the fill-in stub of the tank housing of FIG. 11.
Figure 13:
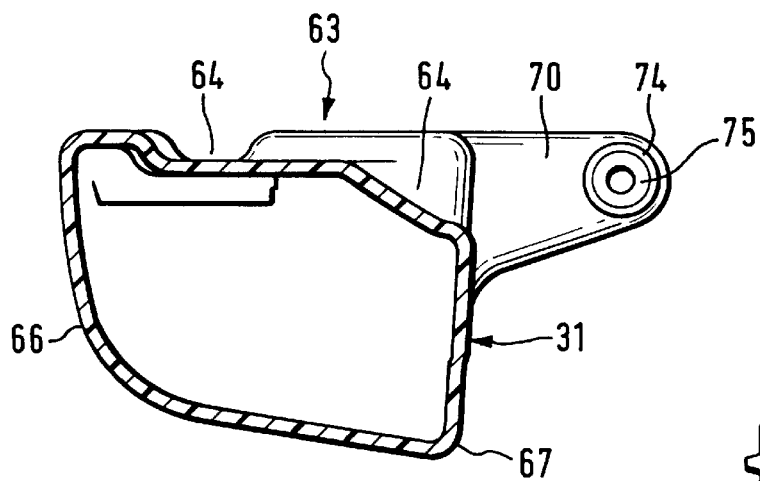
FIG. 13 is a section view taken along line XIII—XIII of FIG. 11.

The tank housing is shown in plan view in FIG. 11 and has essentially the shape of a U having a shorter leg 70 and a longer leg 71. The longer leg 71 has a fill stub 72 having a fill opening 73 which lies on the side facing away from the shorter leg 70. The shorter leg 70 carries a cylindrical connecting nipple 75 facing toward the longer leg 71. The connecting nipple 75 has a peripherally extending back cut sealing edge 74. As shown in FIG. 4, the connecting nipple 75 is configured as one piece with the tank housing 31 and engages into the intake connection 51 fixed in the housing with its sealing ring 74. A sealing collar 76 is mounted between the connecting nipple 75 and the bore of the intake connection 51 as a seal. Advantageously, a mesh platelet 96 is held between the end face of the sealing collar 76 and the pump cylinder 27.

The longer leg 71 carries an assembly flange 77 having a receiving bore 78 for an attachment screw. A corresponding assembly flange 79 has a receiving bore 78 and is provided in the foot region of the shorter leg 70 near the forward end wall 66. The attachment flange 79 is shown in plan view in FIG. 11 and lies within the contour of the tank housing 31. A reinforcement strut 80 extends on the inner side of the longer leg 71 for stiffening the tank housing 31. The reinforcement strut 80 extends on the inner side of the longer leg 71. The reinforcement strut 80 extends in the foot region of the leg 71 to the side on the tank housing 31 facing toward the gear assembly housing 9. The stiffening flange 80 lies parallel and close to the attachment flange 23 and engages behind a corner 81 of the gear assembly housing 9 as shown in FIG. 4.

Figure 14:
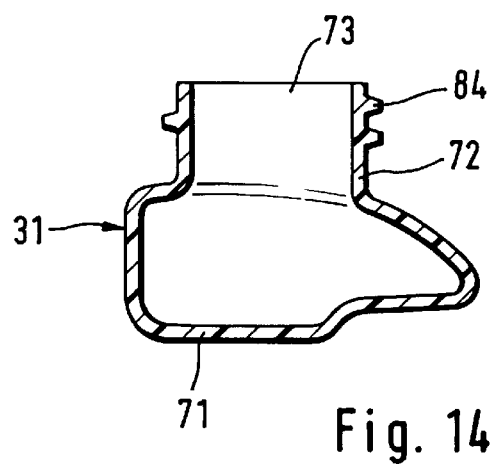
FIG. 14 is a section view taken along line XIV—XIV of FIG. 11.
Figure 16:
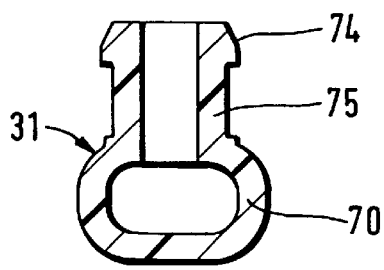
FIG. 16 is a section view taken along line XVI—XVI of FIG. 11.

As shown in the section views of FIGS. 14 and 16, the longer leg 71 having the fill stub 72 is configured to have a larger cross section than the shorter leg 70 having the connecting nipple 75. This ensures, on the one hand, a convenient filling of the tank housing 31, which is shaped to maximize the use of available space; whereas, on the other hand, the smaller cross section in the region of the connecting nipple 75 ensures that lubricating oil is present at the intake connection 51 of the lubricating-oil pump 29 in substantially every operational position of the cutterhead 5. Corresponding to the operating position of the overhead branch cutter, which is to be expected as a rule, the connecting nipple 75 of the tank housing is inserted in the intake connection 51 on the lower side of the gear assembly housing 9. The connecting nipple 75 lies approximately perpendicularly to the leg 70 and approximately diametrically opposite to the inlet opening 73 in relationship to the gear assembly housing 9. The tank housing 31 is manufactured with the fill stub 72, the connecting nipple 75, the stiffening flange 80 and the assembly flanges (77, 79) as one piece from plastic. It is preferable to provide transparent plastic to facilitate checking the oil level in the tank housing.

The fill stub 72 is closed with a cap 85 which is threadably engaged with an external thread 84 of the fill stub 72. To avoid an unintended loosening of the cap 85, the handle 86, which is provided on the cap 85, is aligned in the longitudinal direction to the guide bar 10 or to the attachment flange 23 in the closed position of the cap 85. The handle 86 is configured so as to be slightly tapered to its narrower end faces 87.

The connecting nipple 75 interlockingly engages in the intake connection 51 fixed on the housing. The connecting nipple 75 defines an attachment point of the tank housing 31 on the attaching flange 23 or on the gear assembly housing 9.

It can be advantageous to clip the U-shaped tank housing 31 in a simple manner onto the gear assembly housing 9 for attachment to the cutterhead 5. According to the invention, the legs 70 and 71 engage the gear assembly housing 9 lying perpendicularly to the plane 33 of the attachment flange 23. The ends of the legs 70 and 71 are at a spacing from each other which is less than the diameter of the gear assembly housing 9. A receptacle is formed between the legs for the gear assembly housing. The legs 70 and 71 lie on the gear assembly housing 9 with an elastic pretensioning. A reliable holding of the lubricating-oil tank 30 on the cutterhead 5 is provided in combination with the connecting nipple 75 of the tank housing 31 which engages in a force tight or form tight manner in the intake connection 51 fixed on the housing.

It is understood that the foregoing description is that of the preferred embodiments of the invention and that various changes and modifications may be made thereto without departing from the spirit and scope of the invention as defined in the appended claims.

What is claimed is:

1. A cutterhead for an overhead branch cutter, the cutterhead comprising:
   a work tool;
   a gear assembly housing having a lower housing part and an upper housing part defining a closure cover for said lower housing part;
   a gear assembly mounted in said housing and including an input shaft and an output shaft disposed transversely to said input shaft; first bearing means and second bearing means for journalling said input shaft and said output shaft, respectively, in said gear assembly housing; and, gear means mounted between said input shaft and said output shaft;
   said lower housing part and said upper housing part conjointly defining a partition plane partitioning said first and second bearing means;
   a one piece attachment flange formed on said lower housing part;
   said output shaft having an outer end extending through said attachment flange;
   said work tool being mounted on said attachment flange and being operatively connected to said outer end of said output shaft;
   a lubricating-oil pump mounted in said lower housing part;
   said lubricating-oil pump being operatively connected to said output shaft so as to be driven thereby;
   said attachment flange having a first side facing toward said work tool and a second side facing toward said gear assembly housing;
   a lubricating-oil tank mounted on said second side and extending approximately coextensively with said attachment flange; and,
   said lubricating-oil tank surrounding said gear assembly housing over an encompassing angle of more than 180°.

2. The cutterhead of claim 1, wherein said lubricating-oil pump is pressed into said lower housing part.

3. The cutterhead of claim 1, said output shaft having an inner end facing away from said attachment flange, said gear means being a bevel-gear assembly including a bevel gear mounted on said inner end of said output shaft; and, a drive gear disposed between said bevel gear and said attachment flange for driving said lubricating-oil pump.

4. The cutterhead of claim 1, wherein said encompassing angle is approximately 225°.

5. The cutterhead of claim 1, said lower housing part defining an intake opening leading to said lubricating-oil pump and said lubricating-oil tank having a connecting nipple engaging said intake opening.

6. The cutterhead of claim 5, said connecting nipple and said lubricating-oil tank being configured as one piece made of plastic.

7. The cutterhead of claim 5, said gear assembly housing having a lower side; and, said connecting nipple being disposed at the lower side of said gear assembly housing.

8. The cutterhead of claim 5, said lubricating-oil tank having an approximately U-shaped configuration when viewed in side elevation; said U-shaped configuration having a first leg defining an end region and a second leg defining an end region; said connecting nipple being disposed in said end region of said first leg; and, said lubricating-oil tank having a fill opening in the end region of said second leg.

9. The cutterhead of claim 8, said first leg being configured so as to be narrower than said second leg.

10. The cutterhead of claim 8, said connecting nipple and said fill opening lying approximately diametrically opposite each other referred to said gear assembly housing.

11. The cutterhead of claim 8, said second leg being longer than said first leg and having a side facing toward said gear assembly housing; said second leg having a reinforcement flange connected to said lubricating-oil tank and lying approximately parallel to said attachment flange; and, said lubricating-oil tank and said attachment flange being mutually adjacent to conjointly define a small spacing therebetween.

12. The cutterhead of claim 11, said lubricating-oil tank having a side facing toward said attachment flange and said side of said lubricating-oil tank having recesses formed therein for accommodating sections projecting out of the plane of said attachment flange.

13. The cutterhead of claim 1, said lubricating-oil tank having an outer side facing away from said attachment flange; and, said outer side being rounded.

14. The cutterhead of claim 1, said lubricating-oil tank having a maximum height (a) measured perpendicularly to said attachment flange; said gear assembly housing having an axial height (b) likewise measured perpendicularly to said attachment flange; and, said height (a) being equal to or slightly greater than said height (b).

15. The cutterhead of claim 1, said work tool including: a guide bar; a saw chain mounted on said guide bar so as to move along the periphery thereof; a sprocket wheel mounted on said outer end of said output shaft for engaging and driving said saw chain; a sprocket wheel cover; and, means for clamping said guide bar between said attachment flange and said sprocket wheel cover.

16. The cutterhead of claim 15, said cutterhead having a lower side; and, said sprocket wheel cover having a peripheral edge facing toward said guide bar; said peripheral edge being closed and having a chip discharge opening open toward the lower side of said cutterhead.

17. The cutterhead of claim 1, said lower and upper housing parts conjointly defining a connecting sleeve disposed forward of said input shaft.

18. The cutterhead of claim 17, said connecting sleeve defining a longitudinal axis; said attachment flange defining a plane; said longitudinal axis and said plane being approximately parallel to each other and extending in mutually opposite directions away from said gear assembly housing.

* * * * *